US011017379B2

(12) United States Patent
Williams et al.

(10) Patent No.: US 11,017,379 B2
(45) Date of Patent: May 25, 2021

(54) SYSTEM AND METHODS FOR ENHANCED AUTHORIZATION OF PREPAID CARDS

(71) Applicant: MasterCard International Incorporated, Purchase, NY (US)

(72) Inventors: Kyle Williams, O'Fallon, MO (US); David J. Senci, Troy, IL (US); Michelle L. Hafner, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 785 days.

(21) Appl. No.: 15/386,664

(22) Filed: Dec. 21, 2016

(65) Prior Publication Data

US 2018/0174133 A1   Jun. 21, 2018

(51) Int. Cl.
| | | |
|---|---|---|
| *G06Q 40/00* | (2012.01) | |
| *G06Q 20/34* | (2012.01) | |
| *G06Q 20/40* | (2012.01) | |
| *G06Q 20/28* | (2012.01) | |

(52) U.S. Cl.
CPC ............ *G06Q 20/342* (2013.01); *G06Q 20/28* (2013.01); *G06Q 20/348* (2013.01); *G06Q 20/351* (2013.01); *G06Q 20/409* (2013.01); *G06Q 20/4016* (2013.01)

(58) Field of Classification Search
CPC ...... G06Q 40/00; G06Q 20/342; G06Q 20/28; G06Q 20/348; G06Q 20/351; G06Q 20/4016; G06Q 20/409

See application file for complete search history.

(56) References Cited

U.S. PATENT DOCUMENTS

| | | |
|---|---|---|
| 7,409,358 B2 | 8/2008 | Baumgartner et al. |
| 7,657,482 B1 | 2/2010 | Shirey et al. |
| 7,668,751 B2 | 2/2010 | Baumgartner et al. |

(Continued)

FOREIGN PATENT DOCUMENTS

EP   2482244 A2   8/2012

OTHER PUBLICATIONS

Digital cash and the surveillance society: Negotiating identification in new consumer payment systems Phillips, David J. University of Pennsylvania, ProQuest Dissertations Publishing, 1998. 9829972. (Year: 1998).*

(Continued)

*Primary Examiner* — Lalita M Hamilton
(74) *Attorney, Agent, or Firm* — Armstrong Teasdale LLP

(57) ABSTRACT

A computer-implemented method for enhancing authorization of prepaid payment cards is provided. The method is implemented using an authorization computing device in communication with a memory. The method includes storing a plurality of transaction histories associated with a plurality of prepaid payment cards, receiving an authorization request for a payment transaction between a cardholder and an originating merchant initiated using a prepaid payment card, determining a transaction history associated with the prepaid payment card based on the plurality of transaction histories, calculating a prepaid risk score for the payment transaction based on the authorization request and the determined transaction history, and transmitting the prepaid risk score to the originating merchant.

18 Claims, 6 Drawing Sheets

(56) References Cited

U.S. PATENT DOCUMENTS

| | | | |
|---|---|---|---|
| 8,036,981 B2 | 10/2011 | Shirey et al. | |
| 2002/0161711 A1 | 10/2002 | Sartor et al. | |
| 2009/0254480 A1 | 10/2009 | Esslinger et al. | |
| 2011/0215139 A1 | 9/2011 | Herold et al. | |
| 2011/0258118 A1 | 10/2011 | Ciurea | |
| 2012/0130853 A1* | 5/2012 | Petri | G06Q 30/0609 705/26.35 |
| 2012/0197802 A1* | 8/2012 | Smith | G06Q 20/12 705/44 |
| 2012/0323783 A1 | 12/2012 | Canetto | |
| 2013/0138563 A1* | 5/2013 | Gilder | G06Q 20/4016 705/44 |
| 2013/0144785 A1* | 6/2013 | Karpenko | G06Q 20/409 705/44 |
| 2014/0304148 A1 | 10/2014 | Flanagan et al. | |
| 2016/0005029 A1 | 1/2016 | Ivey et al. | |
| 2016/0086184 A1* | 3/2016 | Carpenter | G06Q 20/4016 705/44 |
| 2016/0189292 A1* | 6/2016 | Deshpande | G06Q 40/025 705/38 |
| 2016/0321649 A1* | 11/2016 | Dragushan | G06Q 20/342 |
| 2018/0330346 A1* | 11/2018 | Grassadonia | G06Q 20/10 |

OTHER PUBLICATIONS

PCT International Search Report and Written Opinion, Application No. PCT/US2017/063558, dated Feb. 16, 2018, 12 pps.

\* cited by examiner

SYSTEM AND METHODS FOR ENHANCED AUTHORIZATION OF PREPAID CARDS

BACKGROUND OF THE DISCLOSURE

The field of the disclosure relates generally to enhanced authorization of prepaid payment cards, and more specifically to methods and systems for determining the risk associated with processing a payment transaction for a prepaid payment card.

Some financial institutions issue prepaid transaction cards to consumers. Such institutions are also known as "issuer banks" or "issuers." Prepaid transaction cards, also known as prepaid payment cards, have an account associated therewith at the issuer bank. Prepaid transaction cards have a predetermined amount of money associated with them in the account. When the card is used in a transaction, money is withdrawn from that account. Some prepaid cards are reloadable, where a cardholder may add money to the account associated with the prepaid card. Other prepaid cards are non-reloadable and can only be redeemed for the original amount in the account.

Some card not present and e-commerce merchants encounter fraud and non-payments when customers complete their checkout with prepaid payment cards. This may lead to significant losses for the merchant and allow the customers to manipulate the system to receive free goods and services. For example, a customer may use a prepaid payment card with a limited amount of money remaining on it to pay for the first part of a recurring or potential multi-part transaction. The card includes enough money for the first part of the transaction. After the goods are transferred or the services are performed, the merchant determines that the card does not include enough funds to pay for the second part of the transaction and is declined. If the customer has already left, then the merchant is out the second amount.

Many strategies that have been used by merchants to mitigate this issue lead to poor cardholder experiences. However, there is a need for a system for processing prepaid transaction cards to prevent customers from manipulating the system with prepaid payment cards.

BRIEF DESCRIPTION OF THE DISCLOSURE

In one aspect, a computer-implemented method for enhancing authorization of prepaid payment cards is provided. The method is implemented using an authorization computing device in communication with a memory. The method includes storing, at the authorization computing device, a plurality of transaction histories associated with a plurality of prepaid payment cards, receiving, at the authorization computing device, an authorization request for a payment transaction between a cardholder and an originating merchant initiated using a prepaid payment card, determining, at the authorization computing device, a transaction history associated with the prepaid payment card based on the plurality of transaction histories, calculating, at the authorization computing device, a prepaid risk score for the payment transaction based on the authorization request and the determined transaction history, and transmitting, at the authorization computing device, the prepaid risk score to the originating merchant.

In another aspect, an authorization computing device used for enhancing authorization of prepaid payment cards is provided. The authorization computing device includes a processor communicatively coupled to a memory device. The processor is programmed to store a plurality of transaction histories associated with a plurality of prepaid payment cards, receive an authorization request for a payment transaction between a cardholder and an originating merchant initiated using a prepaid payment card, determine a transaction history associated with the prepaid payment card based on the plurality of transaction histories, calculate a prepaid risk score for the payment transaction based on the authorization request and the determined transaction history, and transmit the prepaid risk score to the originating merchant.

In yet another aspect, at least one non-transitory computer-readable storage media having computer-executable instructions embodied thereon is provided. When executed by an authorization computing device having at least one processor coupled to at least one memory device, the computer-executable instructions cause the processor to store a plurality of transaction histories associated with a plurality of prepaid payment cards, receive an authorization request for a payment transaction between a cardholder and an originating merchant initiated using a prepaid payment card, determine a transaction history associated with the prepaid payment card based on the plurality of transaction histories, calculate a prepaid risk score for the payment transaction based on the authorization request and the determined transaction history, and transmit the prepaid risk score to the originating merchant.

BRIEF DESCRIPTION OF THE DRAWINGS

FIG. 1 is a schematic diagram illustrating an example multi-party payment card processing system for enabling payment-by-card transactions between merchants, cardholders, and card issuers.

FIG. 2 is a simplified block diagram of an example system used for enhanced authorization of prepaid payment cards.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for enhanced authorization of prepaid payment cards using the system shown in FIG. 2.

FIG. 6 is a diagram of components of one or more example computing devices that may be used in the system shown in FIG. 2.

DETAILED DESCRIPTION OF THE DISCLOSURE

Figure 1:
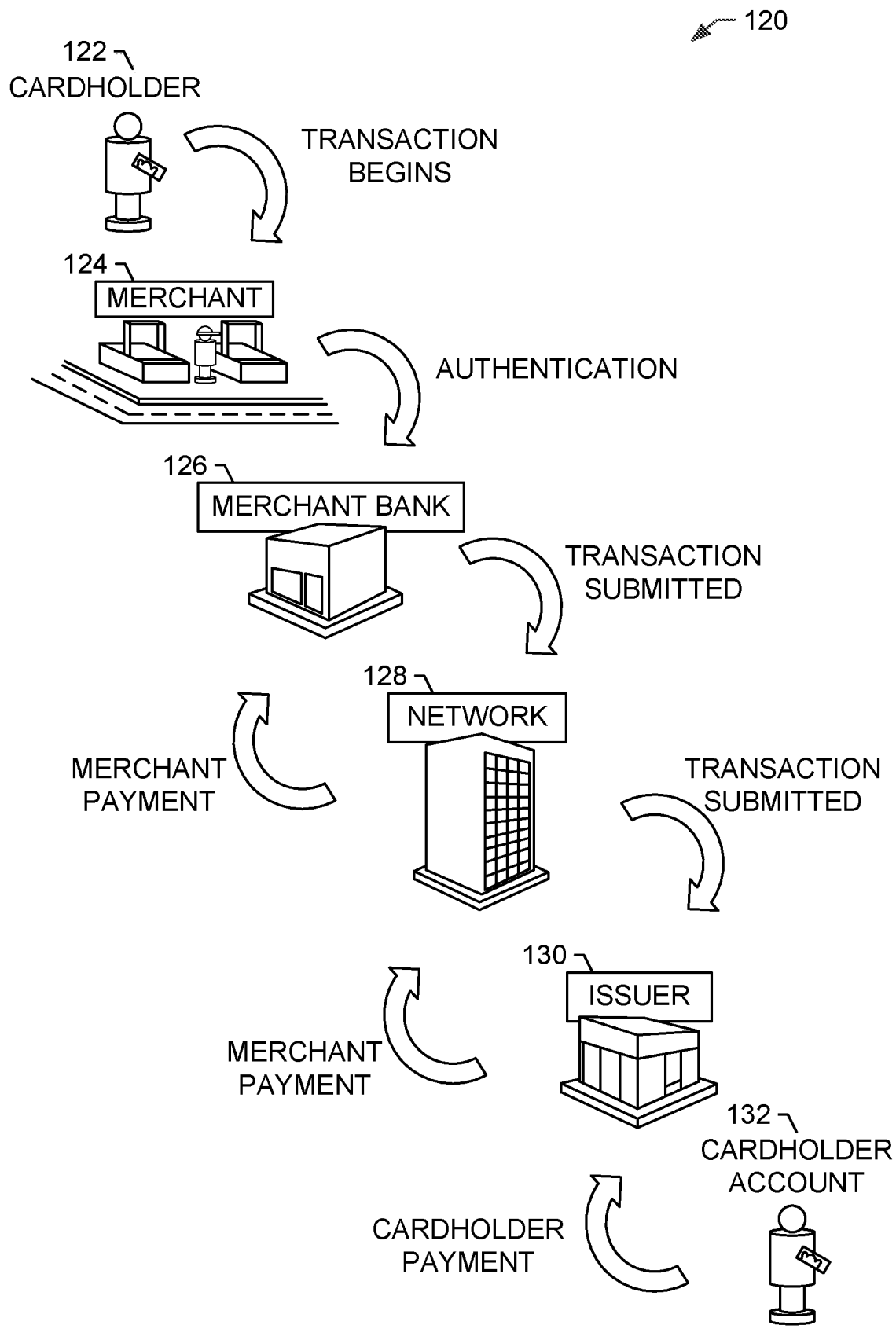
FIGS. 1-6 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure of the system and methods to determining the risk associated with processing a payment transaction for a prepaid payment card.

In the example embodiment, an authorization computer device associated with a payment network is configured to determine risks of prepaid payment cards. The authorization computer device stores a plurality of transaction histories associated with a plurality of prepaid payment cards. The plurality of transaction histories include transactions for each prepaid payment card processed by an interchange network associated with the payment network. In the example embodiment, the transaction histories include information about transactions that were successfully processed and information about transactions that were denied. The information may include, but is not limited to, transaction amount, transaction date, transaction location, originating merchant, reason for denial, and any other pertinent information about the transaction. Each transaction history is associated with a prepaid payment card. In the exemplary embodiment, the prepaid payment card is not tied to a specific cardholder and the associated account does not include information to identify the cardholder.

In the example embodiment, the authorization computer device receives an authorization request for a payment transaction between a cardholder and an originating merchant. In the example embodiment, the payment transaction is for the purchase of goods or services and was initiated with a prepaid payment card. In the example embodiment, the prepaid payment card is non-reloadable. In other embodiments, the prepaid payment card is reloadable. The authorization request includes at least a transaction amount and information identifying the originating merchant, such as, but not limited to, merchant name, merchant category, and merchant location.

In the example embodiment, the authorization computer device determines which transaction history of the plurality of transaction histories is associated with the prepaid payment card. In the example embodiment, the determined transaction history includes information about all of the transactions that have been conducted with the prepaid payment card. In some situations, the prepaid payment card may not have been previously used in a transaction, and the transaction history reflects that information. In the example embodiment, the authorization computer device determines the transaction history associated with the prepaid payment card by querying a database to search the plurality of transaction histories based on the personal account number (PAN) of the prepaid payment card.

In the example embodiment, the authorization computer device calculates a prepaid risk score for the payment transaction based on the information in the authorization request and the determined transaction history. In the example embodiment, the authorization computer device calculates the prepaid risk score based on the number and amount of transactions that have been successfully processed, the number and amount of transactions that have been denied, and the amount of the present transaction, and the merchant associated with the present transaction. For example, if a prepaid payment card has been declined several times over a recent period of time, the authorization computer device may calculate a higher risk.

In the example embodiment, the authorization computer device transmits the prepaid risk score to the originating merchant. In some embodiments, the originating merchant requests the prepaid risk score directly from the authorization computer device, such as through an Application Programming Interface (API) call. In these embodiments, the authorization computer device transmits the prepaid risk score directly to the merchant. In other embodiments, the authorization computer device receives the authorization request from either a merchant bank or the payment network as a part of processing the payment transaction. In these embodiments, the authorization computer device transmits the prepaid risk score in the authorization response message.

In some embodiments, the merchant uses the prepaid risk score to determine whether or not to approve the payment transaction. For example, if the risk is too high, then the merchant may request an additional form of payment for incidental expenses, such as late fees and overcharges. The merchant may also authorize the prepaid payment card for the maximum possible amount including any potential additional fees.

In other embodiments, the merchant has enrolled in a service that allows the authorization computer device to determine whether or not to approve a prepaid payment card transaction. In these embodiments, the authorization computer device transmits whether or not to approve the payment transaction along with the prepaid risk score. In these embodiments, the merchant has previously provided one or more approval rules to the authorization computer device. The authorization computer device stores these rules in the database. When the authorization computer device receives an authorization request from the merchant for a prepaid payment card, the authorization computer device retrieves the one or more approval rules from the database and applies those rules to the payment transaction to calculate the prepaid risk score, determine whether or not to approve the payment transaction, and determine a reason for the approval or denial of the payment transaction. In some further embodiments, the authorization computer device also determines a reason associated with the prepaid risk score. The reason may include information about why the prepaid risk score is at the level that it is, such as an estimated amount of funds remaining in the account. The reason may also include information about why the payment transaction should be approved or denied. The reason further may include information about proposed courses of action for the merchant.

In some embodiments, the payment transaction is a first payment transaction, such as an authorization to confirm that the card is real, where the first transaction will be followed by a second transaction. For example, a cardholder may sign up for a service with the merchant. The service may have a variable cost, such as a taxi ride. The merchant charges $1 to the card provided to ensure that the card number is correct. When the service is complete, the merchant then charges the provided card for the rest of the amount of the service. If the card does not have enough funds, the transaction would be denied and the merchant is potentially out of the funds. In another example, a cardholder rents a movie with the prepaid payment card. If the card only has $1.36 left on it and the rental is for $1, then the first payment transaction goes through. However, if the cardholder accrues late fees or damages the movie, the merchant will attempt to charge the payment card on file and have the charges denied. While the merchant may suspend the account of the cardholder, the merchant is still out the additional funds.

To counter these examples, the authorization computer device determines a transaction type for the payment transaction based on the merchant and the transaction amount of the payment transaction. For example, if the merchant is a taxi service or movie rental service and the transaction amount is $1, the authorization computer device determines that there is a high probability of there being a subsequent transaction from merchant based on the first transaction. If the merchant is a grocery store and the transaction amount is $65, then the authorization computer device determines that this is probably a grocery purchase and there is a low probability of there being a subsequent transaction from that merchant.

In some embodiments, the authorization computer device determines a potential amount for the subsequent payment transaction. In some further embodiments, the authorization computer device calculates the potential amount as the average of past subsequent transactions for that transaction type, such as in the case of a taxi ride service. In other further embodiments, the authorization computer device calculates the potential amount as the maximum fees that the cardholder may accrue. In still further embodiments, the authorization computer device calculates the potential amount based on the one or more rules provided by the merchant or based on one or more spending trends determined about either the merchant or the cardholder.

In the above embodiments, the authorization computer device determines whether or not there are sufficient funds in the prepaid payment card's account based on the transaction history of the prepaid payment card. In some embodiments, the authorization computer device determines a maximum amount on the prepaid payment card based on the transaction history, specifically one or more payment transactions conducted by the prepaid payment card that were denied for insufficient funds. For example, if a transaction for $60 was rejected for insufficient funds, the authorization computer device determines that the prepaid payment card has $59 or less left on it. In some embodiments, the authorization computer device uses the BIN to determine the maximum funds that would have been in the payment card account. For example, some prepaid payment cards are sold at a set specific value. The authorization computer device may have determined the set value for cards with a specific BIN or series of PANs based on historical transactions with these cards.

In one example, the first two transactions for a prepaid payment card are a successful $15 purchase and a $125 purchase rejected for insufficient funds. From these transactions, the authorization computer device determines that the prepaid payment card was originally loaded for less than $140 (i.e. $139 or less) and has $124 or less as a remaining balance. The next two transactions are a successful $40 purchase and a successful $25 purchase. The authorization computer device reduces the maximum potential amount remaining on the prepaid payment card by $65 to $59 or less. The authorization computer device may also determine that there is a high probability that the prepaid payment card originally had $100 in its account, since the prepaid payment cards are more likely to have been loaded at $100 than $140. Therefore, there is a high probability that the account has $19 or less left in it. The authorization computer device uses these two values in its calculation of the prepaid risk score. If the transaction is for less than $20, then the authorization computer device calculates a good prepaid risk score for the transaction. If the transaction may lead to a $100 subsequent transaction, then the authorization computer device may calculate a bad prepaid risk score for the payment transaction.

In the example embodiment, the prepaid payment card is a non-reloadable card. In other embodiments, the prepaid payment card is reloadable, where the cardholder is able to pay money into the account. For reloadable prepaid payment cards, the authorization computer device determines the probability that the cardholder paid additional money into the account. For example, the authorization computer device may determine that the cardholder paid money into account because successful transactions were processed for more than that previously determined estimated funds remaining in account. Using the above example, if the next successful transaction was for $100, then the authorization computer device determines that the cardholder added funds to the associated account. The authorization computer device may also determine a trend for prepaid payment cards from a specific PAN series or BIN being reloaded and include that trend in determining the prepaid risk score.

The methods and system described herein may be implemented using computer programming or engineering techniques including computer software, firmware, hardware, or any combination or subset. As disclosed above, at least one technical problem with prior systems is that there is a need for determining the risk of processing prepaid payment cards, where the actual amount in the associated account is not known. The system and methods described herein address that technical problem. The technical effect of the systems and processes described herein is achieved by performing at least one of the following steps: (a) storing a plurality of transaction histories associated with a plurality of prepaid payment cards; (b) receiving an authorization request for a payment transaction between a cardholder and an originating merchant initiated using a prepaid payment card; (c) determining a transaction history associated with the prepaid payment card based on the plurality of transaction histories; (d) determining an estimated remaining balance on the prepaid payment card based on the determined transaction history, where the determined transaction history includes at least one denied payment transaction for insufficient funds; (e) calculating a prepaid risk score for the payment transaction based on the authorization request and the determined transaction history; (f) determining a reason associated with the prepaid risk score based on the authorization request and the determined transaction history; and (g) transmitting the prepaid risk score and the reason to the originating merchant. The resulting technical effect is a more accurate authorization system that provides a method of using merchant rules and transaction history to determine the risk associated with multi-part transactions and prepaid payment cards.

Another technical effect of the systems and processes described herein is achieved by performing at least one of the following steps: (a) storing one or more approval rules for the originating merchant; (b) calculating the prepaid risk score based on the authorization request, the determined transaction history, and the one or more approval rules; (c) determining whether to approve the payment transaction based on a comparison of the prepaid risk score and the one or more approval rules; (d) if the determination is to not approve the payment transaction, transmitting the determination and the prepaid risk score to the originating merchant; and (e) transmitting the authorization request to an issuer computer device if the determination is to approve the payment transaction.

A further technical effect of the systems and processes described herein is achieved by performing at least one of the following steps: (a) determining a transaction type for the payment transaction based on the originating merchant and the first amount; (b) determining a second amount for a potential subsequent payment transaction based on the transaction type, where the second amount is at least one of an average amount for the subsequent transaction based on the transaction type and a potential post-transaction fee based on the transaction type; (c) determining a potential maximum amount of funds associated with the prepaid payment card based on the BIN, where the prepaid payment card is associated with a bank identification number (BIN); (d) determining an estimated remaining balance on the prepaid payment card based on the determined transaction history and the determined potential maximum amount; (e) comparing the estimated remaining balance to the first amount and the second amount; and (f) determining whether there are sufficient funds associated with the prepaid payment card based on the comparison.

The resulting technical benefits achieved by this system include at least one of: (i) improving the overall efficiency of the payment network by reducing the number of denials for insufficient funds; (ii) reducing the potential for fraudulent transactions; (iii) improved merchant information on risks of transactions; and (iv) improved information on prepaid payment cards.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party payment card processing system 120 for enabling payment-by-card transactions between merchants 124, cardholders 122, and card issuers 130. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In the payment card processing system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, a prepaid payment card is used for the transaction. The prepaid payment card is associated with an account 132 that includes a predetermined amount. For example, a prepaid payment card may be purchased and include a $25 starting balance. Cardholder 122 may use prepaid payment card for a transaction. If account 132 had sufficient funds for the transaction, then the transaction is approved and the necessary funds are transferred to merchant bank 126 and ultimately to merchant 124. If account 132 does not include sufficient funds for the transaction, then issuer bank 130 transmits a transaction declined for insufficient funds message to interchange network 128. Interchange network 128 passes the transaction declined message to merchant bank 126. In the example embodiment, interchange network 128 does not have access to current balance information for the account 132. Furthermore, in the example embodiment, account 132 does not include any personal information about cardholder 122. In some embodiments, cardholder 122 may add additional funds to a prepaid payment card. In other embodiments, prepaid payment card is non-reloadable and additional funds may not be added after the card is initially purchased. In some further embodiments, some prepaid cards are for predetermined amounts (i.e., $25 or $50) and the value of some prepaid cards is set at the time of purchase (i.e. a card may be loaded for an amount between $25 and $200).

Figure 2:
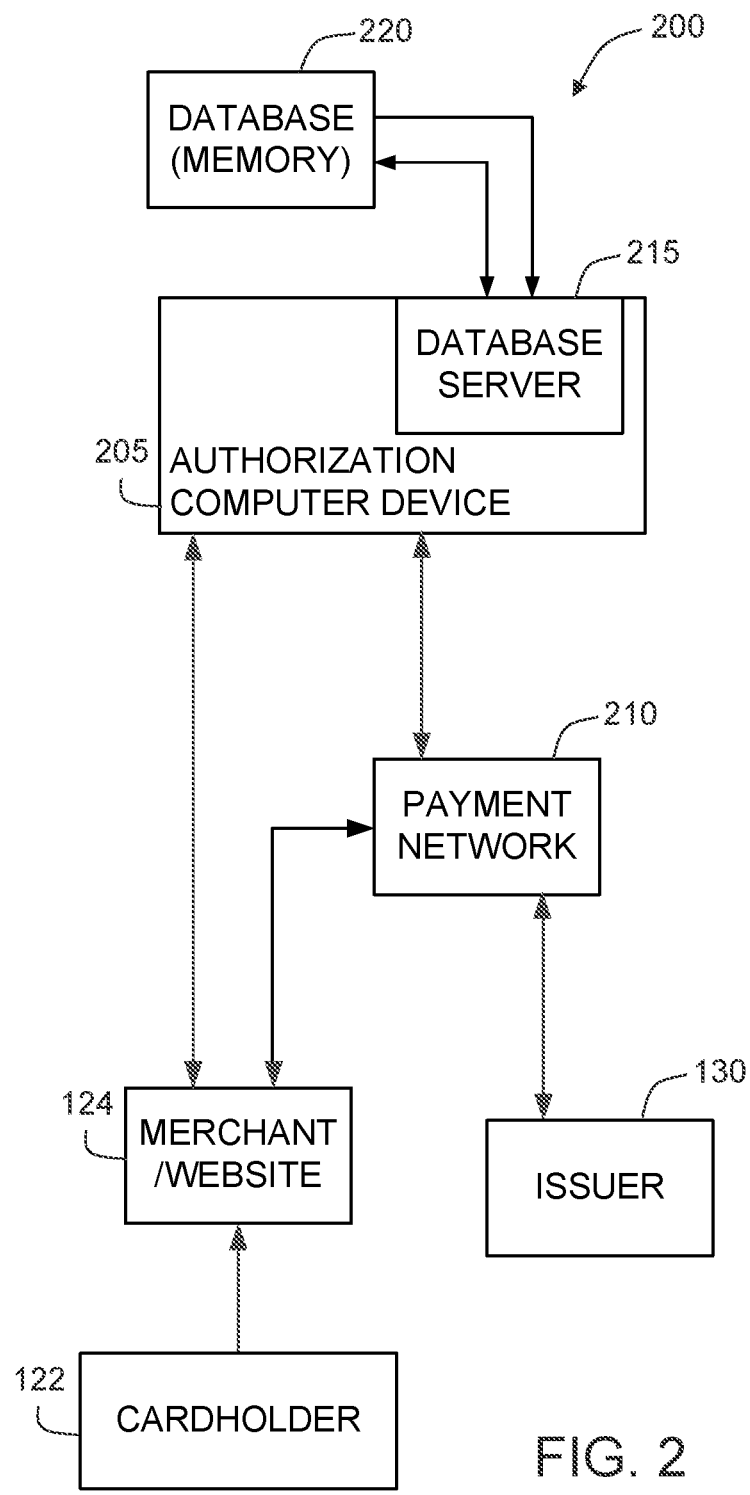

FIG. 2 is a simplified block diagram of an example system 200 used for enhanced authorization of prepaid payment cards. In the example embodiment, system 200 may be used for performing payment-by-card transactions received as part of processing cardholder transactions. In addition, system 200 is a payment processing system that includes an authorization computer device 205 configured to enhance user authentication. As described below in more detail, authorization computer device 205 is configured to store a plurality of transaction histories associated with a plurality of prepaid payment cards, receive an authorization request for a payment transaction between a cardholder 122 and an originating merchant 124 (both shown in FIG. 1) initiated using a non-reloadable prepaid payment card, determine a transaction history associated with the non-reloadable prepaid payment card based on the plurality of transaction histories, calculate a prepaid risk score for the payment transaction based on the authorization request and the determined transaction history, and transmit the prepaid risk score to the originating merchant 124.

A database server 215 is communicatively coupled to a database 220 that stores data. In one embodiment, database 220 includes transaction histories, prepaid risk scores, and merchant rules. In the example embodiment, database 220 is stored remotely from authorization computer device 205. In some embodiments, database 220 is decentralized. In the example embodiment, a person can access database 220 via client systems (not shown) by logging onto authorization computer device 205, as described herein.

Authorization computer device 205 is communicatively coupled with payment network 210. Payment network 210 represents one or more parts of payment card processing system 120 (shown in FIG. 1). In the example embodiment, authorization computer device 205 is in communication with one or more computer devices associated with interchange network 128. In other embodiments, authorization computer device 205 is in communication with one or more computer devices associated with merchant 124 or merchant bank 126 (shown in FIG. 1). In some embodiments, authorization computer device 205 may be associated with, or is part of payment network 210, or in communication with payment network 120, shown in FIG. 1. In other embodiments, authorization computer device 205 is associated with a third party and is in communication with payment network 120. In some embodiments, authorization computer device 205 may be associated with, or be part of merchant bank 126 or interchange network 128. In addition, authorization computer device 205 is communicatively coupled with merchant 124. In the example embodiment, authorization computer device 205 is in communication with merchant 124 via Application Programming Interface (API) calls. Through the API call, merchant 124 may transmit information to and receive information from authorization computer device 205.

When a merchant 124 enrolls in the service, the merchant may provide one or more rules about payment transactions initiated through prepaid payment cards. The one or more rules are stored by authorization computer device 205 in database 220 as a part of the merchant's profile. In the example embodiment, the one or more rules include one or more thresholds that the prepaid payment card must meet to be approved. The one or more rules may also include types of transactions that merchant 124 may conduct and potential subsequent transactions.

In the example embodiment, client systems (not shown) are computers that include a web browser or a software application to enable client systems to access other computer devices using the Internet. More specifically, client systems are communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. Client systems can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, cardholder 122 uses a client system to access a commerce website for merchant 124. In another embodiment, merchant 124 uses a client system to access authorization computer device 205 or access payment card processing system 120.

In some embodiments, authorization computer device 205 may be associated with the financial transaction interchange network 128 shown in FIG. 1 and may be referred to as an interchange computer system. Authorization computer device 205 may be used for processing transaction data and analyzing for fraudulent transactions. Accordingly, authorization computer device 205 may be utilized to process transaction data relating to purchases a cardholder 122 makes utilizing a transaction card processed by interchange network 128 and issued by the associated issuer 130. At least one client system may be associated with a user or a cardholder 122 seeking to a transaction with at least one of interchange network 128, issuer 130, or merchant 124. In addition, client systems may include point-of-sale (POS) devices associated with merchant 124 and used for processing payment transactions. Furthermore, client systems may be used by cardholders or other users to access user accounts online, such as through ecommerce gateways.

Figure 3:
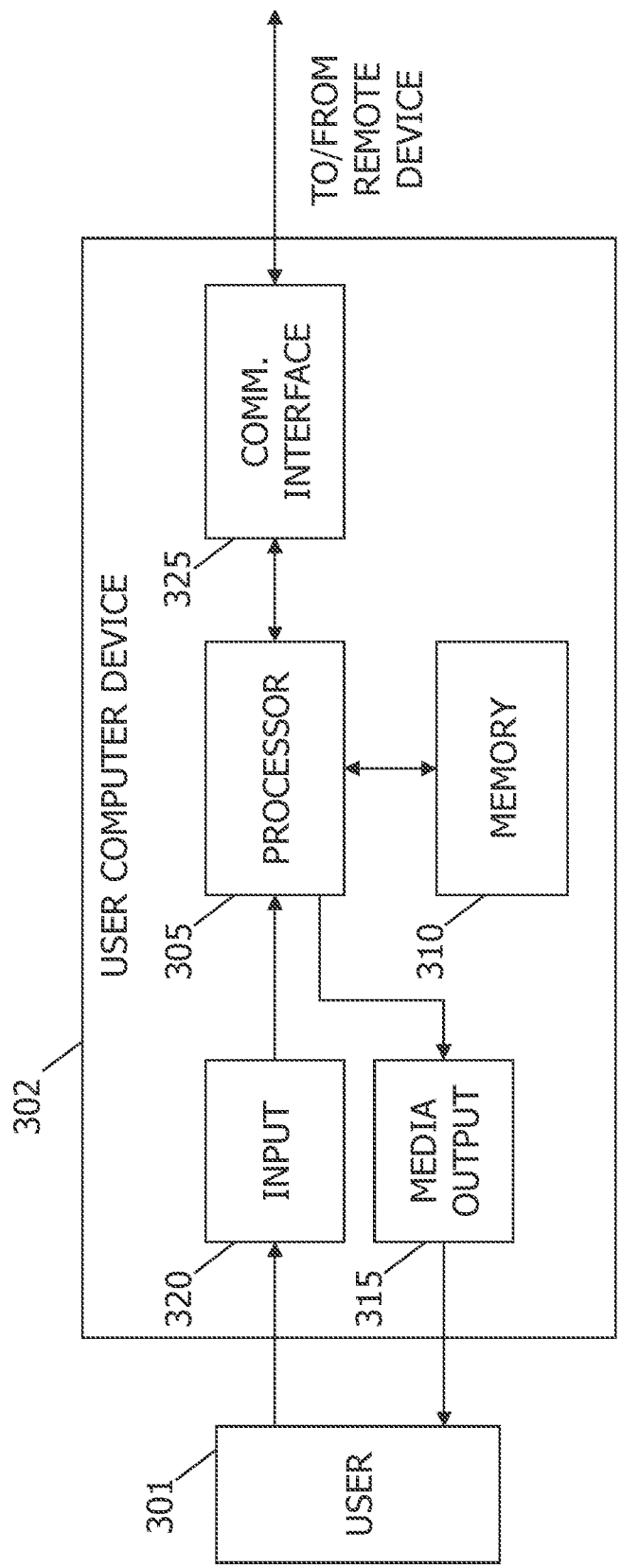

FIG. 3 illustrates an example configuration of a client system shown in FIG. 2, in accordance with one embodiment of the present disclosure. User computer device 302 is operated by a user 301. User computer device 302 may include, but is not limited to, computer devices associated with merchant 124, and computer devices associated with cardholder 122 (both shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as authorization computer device 205 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from a merchant computer device. A client application allows user 301 to interact with, for example, authorization computer device 205. For example, instructions may be stored by a cloud service and the output of the execution of the instructions sent to the media output component 315.

Figure 4:
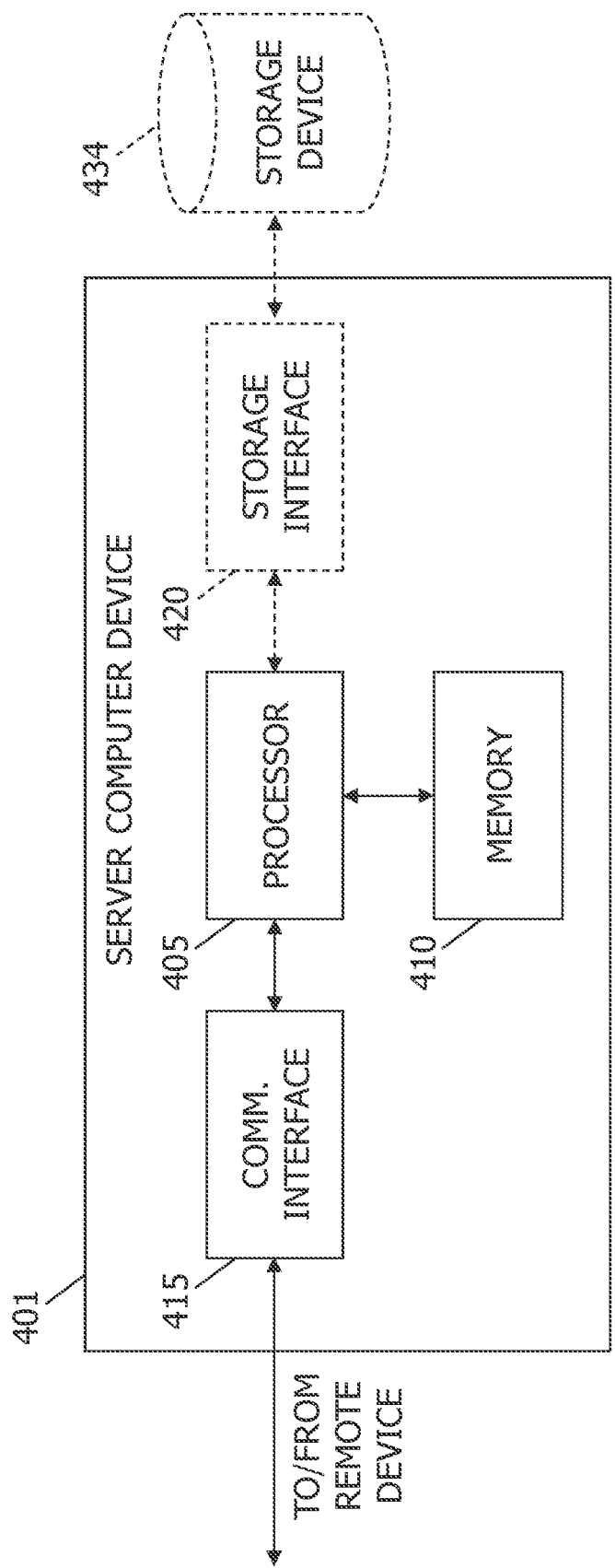

FIG. 4 illustrates an example configuration of a server system shown in FIG. 2, in accordance with one embodiment of the present disclosure. Server computer device 401 may include, but is not limited to, database server 215, merchant/website server 124, and authorization computer device 205 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems, merchant/website server 124, or authorization computer device 205 (all shown in FIG. 2). For example, communication interface 415 may receive requests from client systems via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
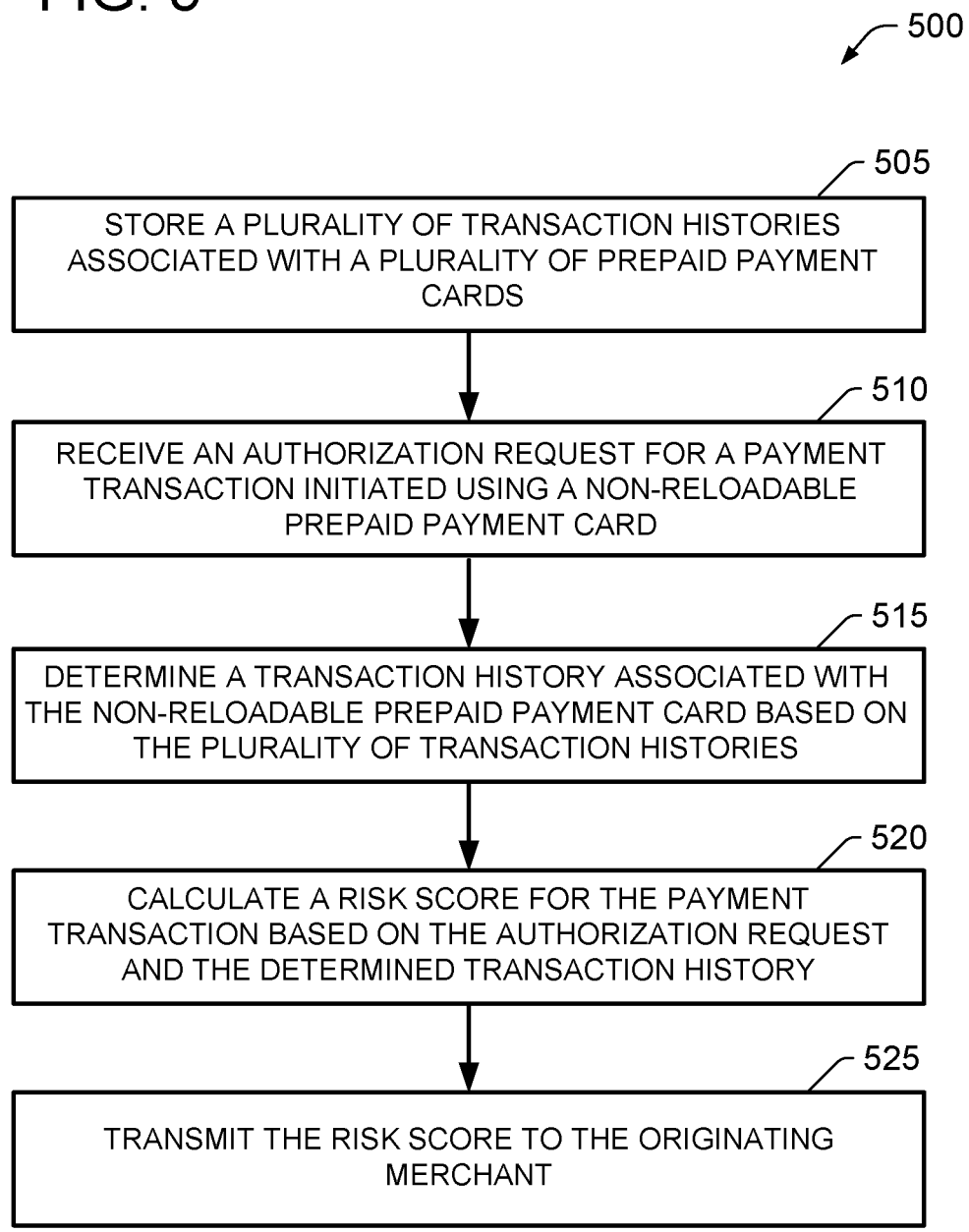

FIG. 5 is a flow chart of a process 500 for enhanced authorization of prepaid payment cards using system 200 shown in FIG. 2. In the example embodiment, process 500 is performed by authorization computer device 205 (shown in FIG. 2).

In the example embodiment, authorization computer device 205 stores 505 a plurality of transaction histories associated with a plurality of prepaid payment cards. The plurality of transaction histories include transactions for each prepaid payment card processed by interchange network 128 (shown in FIG. 1). In the example embodiment, the transaction histories include information about transactions that were successfully processed and information about transactions that were denied. The information may include, but is not limited to, transaction amount, transaction date, transaction location, originating merchant, reason for denial, and any other pertinent information about the transaction. Each transaction history is associated with a prepaid payment card. In the exemplary embodiment, the prepaid payment card is not tied to a specific cardholder 122 and the associated account 132 (both shown in FIG. 1) does not include information to identify cardholder 122.

In the example embodiment, authorization computer device 205 receives 510 an authorization request for a payment transaction between a cardholder 122 and an originating merchant 124 (shown in FIG. 1). In the example embodiment, the payment transaction is for the purchase of goods or services and was initiated with a prepaid payment card. In the example embodiment, the prepaid payment card is non-reloadable. In other embodiments, the prepaid payment card is reloadable. The authorization request includes at least a transaction amount and information identifying originating merchant 124, such as, but not limited to, merchant name, merchant category, and merchant location.

In the example embodiment, authorization computer device 205 determines 515 which transaction history of the plurality of transaction histories is associated with the prepaid payment card. In the example embodiment, the determined transaction history includes information about all of the transactions that have been conducted with the prepaid payment card. In some situations, the prepaid payment card may not have been previously used in a transaction, and the transaction history reflects that information. In the example embodiment, authorization computer device 205 determines 515 the transaction history associated with the prepaid payment card by querying database 220 (shown in FIG. 2) to search the plurality of transaction histories based on the personal account number (PAN) of the prepaid payment card.

In the example embodiment, authorization computer device 205 calculates 520 a prepaid risk score for the payment transaction based on the information in the authorization request and the determined transaction history. In the example embodiment, authorization computer device 205 calculates 520 the prepaid risk score based on the number and amount of transactions that have been successfully processed, the number and amount of transactions that have been denied, and the amount of the present transaction, and merchant 124 associated with the present transaction. For example, if a prepaid payment card has been declined several times over a recent period of time, authorization computer device 205 may calculate 520 a higher risk.

In the example embodiment, authorization computer device 205 transmits 525 the prepaid risk score to originating merchant 124. In some embodiments, originating merchant 124 requests the prepaid risk score directly from authorization computer device 205, such as through an API call. In these embodiments, authorization computer device 205 transmits 525 the prepaid risk score directly to merchant 124. In other embodiments, authorization computer device 205 receives 510 the authorization request from either merchant bank 126 (shown in FIG. 1) or payment network 210 (shown in FIG. 2) as a part of processing the payment transaction. In these embodiments, authorization computer device 205 transmits 525 the prepaid risk score in the authorization response message.

In some embodiments, merchant 124 uses the prepaid risk score to determine whether or not to approve the payment transaction. For example, if the risk is too high, then merchant 124 may request an additional form of payment for incidental expenses, such as late fees and overcharges. Merchant 124 may also authorize the prepaid payment card for the maximum possible amount including any potential additional fees.

In other embodiments, merchant 124 has enrolled in a service that allows authorization computer device 205 to determine whether or not to approve a prepaid payment card transaction. In these embodiments, authorization computer device 205 transmits whether or not to approve the payment transaction along with the prepaid risk score. In these embodiments, merchant 124 has previously provided one or more approval rules to authorization computer device 205. Authorization computer device 205 stores these rules in database 220. When authorization computer device 205 receives 510 an authorization request from merchant 124 for a prepaid payment card, authorization computer device 205 retrieves the one or more approval rules from database and applies those rules to the payment transaction to calculate 520 the prepaid risk score, determine whether or not to approve the payment transaction, and determine a reason for the approval or denial of the payment transaction. In some further embodiments, authorization computer device 205 also determines a reason associated with the prepaid risk score. The reason may include information about why the prepaid risk score is at the level that it is, such as an estimated amount of funds remaining in the account. The reason may also include information about why the payment transaction should be approved or denied. The reason further may include information about proposed courses of action for merchant 124.

In some embodiments, the payment transaction is a first payment transaction, such as an authorization to confirm that the card is real, where the first transaction will be followed by a second transaction. For example, cardholder 122 may sign up for a service with merchant 124. The service may have a variable cost, such as a taxi ride. Merchant 124 charges $1 to the card provided to ensure that the card number is correct. When the service is complete, merchant 124 then charges the provided card for the rest of the amount of the service. If the card does not have enough funds, the transaction would be denied and merchant 124 is potentially out of the funds. In another example, cardholder 122 rents a movie with the prepaid payment card. If the card only has $1.36 left on it, and the rental is for $1, then the first payment transaction goes through. However, if cardholder 122 accrues late fees or damages the movie, merchant 124 will attempt to charge the payment card on file and have the charges denied. While merchant 124 may suspend the account of cardholder 122, merchant 124 is still out the additional funds.

To counter these examples, authorization computer device 205 determines a transaction type for the payment transaction based on merchant 124 and the transaction amount of the payment transaction. For example, if merchant 124 is a taxi service or movie rental service and the transaction amount is $1, authorization computer device 205 determines that there is a high probability of there being a subsequent transaction from merchant based on the first transaction. If merchant 124 is a grocery store and the transaction amount is $65, then authorization computer device 205 determines that this is probably a grocery purchase and there is a low probability of there being a subsequent transaction from that merchant 124.

In some embodiments, authorization computer device 205 determines a potential amount for the subsequent payment transaction. In some further embodiments, authorization computer device 205 calculates the potential amount as the average of past subsequent transactions for that transaction type, such as in the case of a taxi ride service. In other further embodiments, authorization computer device 205 calculates the potential amount as the maximum fees that cardholder 122 may accrue. In still further embodiments, authorization computer device 205 calculates the potential amount based on the one or more rules provided by merchant 124 or based on one or more spending trends determined about either merchant 124 or cardholder 122.

In the above embodiments, authorization computer device 205 determines whether or not there are sufficient funds in prepaid payment card's account 132 based on the transaction history of the prepaid payment card. In some embodiments, authorization computer device 205 determines a maximum amount on the prepaid payment card based on the transaction history, specifically one or more payment transactions conducted by the prepaid payment card that were denied for insufficient funds. For example, if a transaction for $60 was rejected for insufficient funds, authorization computer device 205 determines that the prepaid payment card has $59 or less left on it. In some embodiments, authorization computer device 205 uses the BIN to determine the maximum funds that would have been in the payment card account 132. For example, some prepaid payment cards are sold at a set specific value. Authorization computer device 205 may have determined the set value for cards with a specific BIN or series of PANs based on historical transactions with these cards.

In one example, the first two transactions for a prepaid payment card are a successful $15 purchase and a $125 purchase rejected for insufficient funds. From these transactions, authorization computer device 205 determines that the prepaid payment card was originally loaded for less than $140 (i.e. $139 or less) and has $124 or less as a remaining balance. The next two transactions are a successful $40 purchase and a successful $25 purchase. Authorization computer device 205 reduces the maximum potential amount remaining on the prepaid payment card by $65 to $59 or less. Authorization computer device 205 may also determine that there is a high probability that the prepaid payment card originally had $100 in its account, since the prepaid payment cards are more likely to have been loaded at $100 than $140. Therefore, there is a high probability that the account has $19 or less left in it. Authorization computer device 205 uses these two values in its calculation of the prepaid risk score. If the transaction is for less than $20, then authorization computer device 205 calculates a good prepaid risk score for the transaction. If the transaction may lead to a $100 subsequent transaction, then authorization computer device 205 may calculate a bad prepaid risk score for the payment transaction.

In the example embodiment, the prepaid payment card is a non-reloadable card. In other embodiments, the prepaid payment card is reloadable, where cardholder 122 is able to pay money into account 132. For reloadable prepaid payment cards, authorization computer device 205 determines the probability that cardholder 122 paid additional money into account 132. For example, authorization computer device 205 may determine that cardholder 122 paid money into account 132 because successful transactions were processed for more than that previously determined estimated funds remaining in account. Using the above example, if the next successful transaction was for $100, then authorization computer device 205 determines that cardholder 122 added funds to associated account 132. Authorization computer device 205 may also determine a trend for prepaid payment cards from a specific PAN series or BIN being reloaded and include that trend in determining the prepaid risk score.

Figure 6:
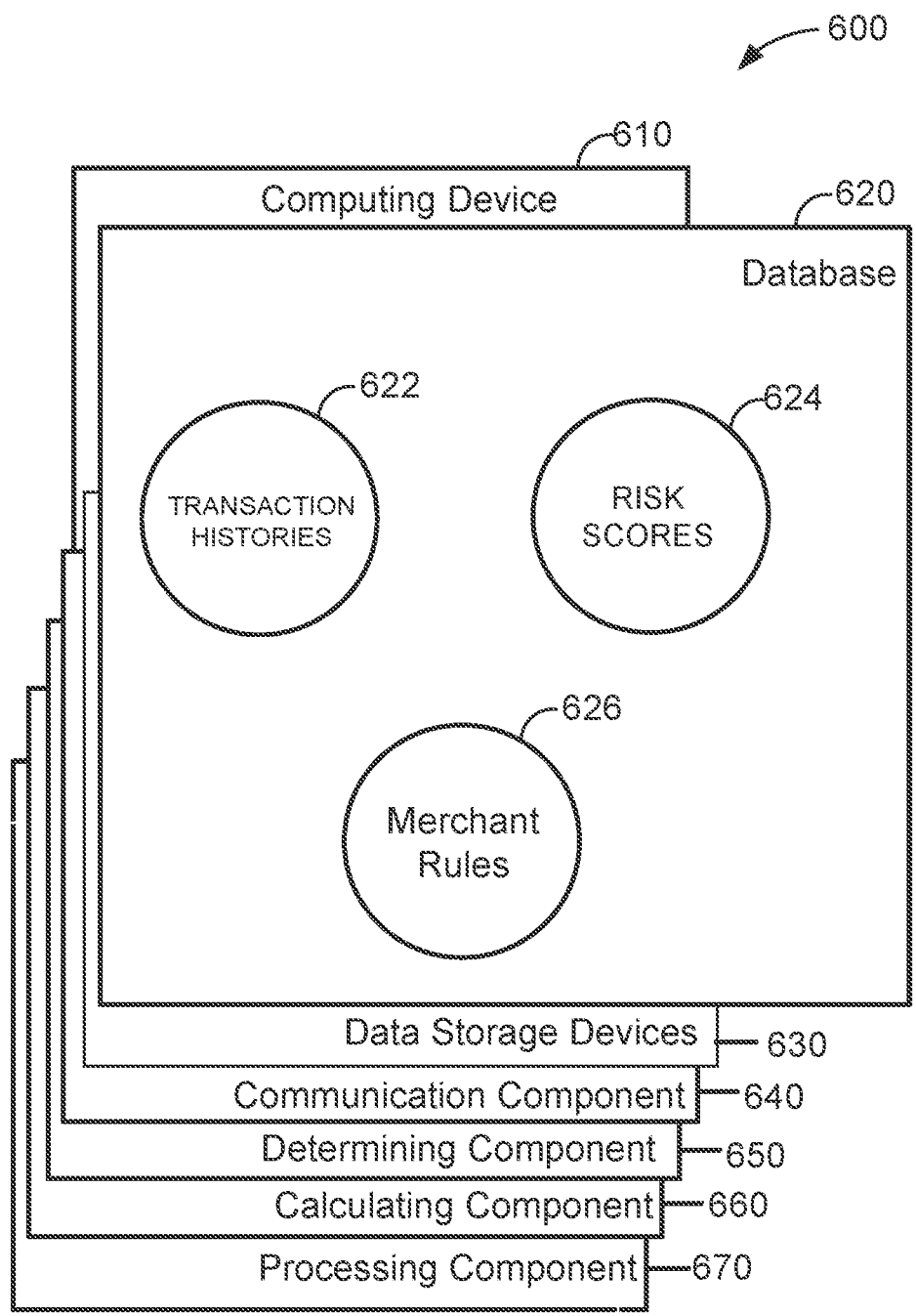

FIG. 6 is a diagram 600 of components of one or more example computing devices that may be used in system 200 shown in FIG. 2. In some embodiments, computing device 610 is similar to authorization computer device 205 (shown in FIG. 2). Database 620 may be coupled with several separate components within computing device 610, which perform specific tasks. In this embodiment, database 620 includes transaction histories 622, prepaid risk scores 624, and merchant rules 626. In some embodiments, database 620 is similar to database 220 (shown in FIG. 2).

Computing device 610 includes database 620, as well as data storage devices 630. Computing device 610 also includes a communication component 640 for receiving 510 an authorization request and transmitting 525 a prepaid risk score (both shown in FIG. 5). Computing device 610 also includes a determining component 650 for determining 515 a transaction history (shown in FIG. 5). Computing device 610 further includes a calculating component 660 for calculating 520 a prepaid risk score (shown in FIG. 5). A processing component 670 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A computer-implemented method for enhancing authorization of prepaid payment cards, said method implemented using an interchange network, and an authorization computing device in communication with a memory and the interchange network, said method comprising:
    routing, by the interchange network, communications between a plurality of merchants and a plurality of issuing banks, the communications formatted according to a set of proprietary communications standards promulgated by the interchange network for the exchange of financial transaction data and the settlement of funds between financial institutions that are members of the interchange network;
    providing, by the interchange network to the authorization computing device, transaction data for transactions by a plurality of prepaid payment cards, the transaction data extracted from the communications processed by the interchange network;
    storing, at the authorization computing device, a plurality of transaction histories associated with the plurality of prepaid payment cards, each of the transaction histories including the transaction data associated with the transactions made by a corresponding one of the plurality of prepaid payment cards;
    receiving, at the authorization computing device directly from an originating merchant via an Application Programming Interface (API) call over the Internet, an authorization request for a payment transaction between a cardholder and the originating merchant initiated using a prepaid payment card, wherein the authorization request includes a personal account number (PAN) of the prepaid payment card and a first amount for the payment transaction;
    determining, by the authorization computing device, that a transaction type for the payment transaction indicates a high probability of a potential subsequent transaction from the originating merchant using the prepaid payment card, wherein the determining is based on the originating merchant and the first amount;
    determining a second amount for the potential subsequent payment transaction based on the transaction type;
    determining whether there are sufficient funds associated with the prepaid payment card for both the first amount and the second amount;
    determining, at the authorization computing device by querying the plurality of transaction histories based on the personal account number (PAN), a transaction history associated with the prepaid payment card;
    calculating, at the authorization computing device, a prepaid risk score for the payment transaction based on the authorization request and the determined transaction history; and
    transmitting, from the authorization computing device in response to the API call, the prepaid risk score directly to the originating merchant.

2. A method in accordance with claim 1, further comprising:
    determining a reason associated with the prepaid risk score based on the authorization request and the determined transaction history; and
    transmitting the prepaid risk score and the reason to the originating merchant.

3. A method in accordance with claim 1, further comprising:
    storing one or more approval rules for the originating merchant; and calculating the prepaid risk score based on the authorization request, the determined transaction history, and the one or more approval rules.

4. A method in accordance with claim 3, further comprising:
determining whether to approve the payment transaction based on a comparison of the prepaid risk score and the one or more approval rules; and
if the determination is to not approve the payment transaction, transmitting the determination and the prepaid risk score to the originating merchant.

5. A method in accordance with claim 4, further comprising transmitting the authorization request to an issuer computer device if the determination is to approve the payment transaction.

6. A method in accordance with claim 1, wherein the second amount is at least one of an average amount for the subsequent transaction based on the transaction type and a potential post-transaction fee based on the transaction type.

7. A method in accordance with claim 1, wherein determining whether there are insufficient funds further comprises:
determining an estimated remaining balance on the prepaid payment card based on the determined transaction history;
comparing the estimated remaining balance to the first amount and the second amount; and
determining whether there are sufficient funds associated with the prepaid payment card based on the comparison.

8. A method in accordance with claim 1, further comprising determining an estimated remaining balance on the prepaid payment card based on the determined transaction history, wherein the determined transaction history includes at least one denied payment transaction for insufficient funds.

9. A method in accordance with claim 1, wherein the prepaid payment card is associated with a bank identification number (BIN) and wherein the method further comprises:
determining a potential maximum amount of funds associated with the prepaid payment card based on the BIN; and
determining an estimated remaining balance on the prepaid payment card based on the determined transaction history and the determined potential maximum amount.

10. An interchange network system comprising:
an interchange network programmed to:
route communications between a plurality of merchants and a plurality of issuing banks, the communications formatted according to a set of proprietary communications standards promulgated by the interchange network for the exchange of financial transaction data and the settlement of funds between financial institutions that are members of the interchange network; and
provide, to an authorization computing device, transaction data for transactions by a plurality of prepaid payment cards, the transaction data extracted from the communications processed by the interchange network; and
said authorization computing device used for enhancing authorization of prepaid payment cards, said authorization computing device comprising a processor communicatively coupled to a memory device, said processor programmed to:
store a plurality of transaction histories associated with the plurality of prepaid payment cards, each of the transaction histories including the transaction data associated with the transactions made by a corresponding one of the plurality of prepaid payment cards;
receive, directly from an originating merchant via an Application Programming Interface (API) call over the Internet, an authorization request for a payment transaction between a cardholder and the originating merchant initiated using a prepaid payment card, wherein the authorization request includes a personal account number (PAN) of the prepaid payment card and a first amount for the payment transaction;
determine that a transaction type for the payment transaction indicates a high probability of a potential subsequent transaction from the originating merchant using the prepaid payment card, wherein the determining is based on the originating merchant and the first amount;
determine a second amount for the potential subsequent payment transaction based on the transaction type;
determine whether there are sufficient funds associated with the prepaid payment card for both the first amount and the second amount;
determine, by querying the plurality of transaction histories based on the personal account number (PAN), a transaction history associated with the prepaid payment card based on the plurality of transaction histories;
calculate a prepaid risk score for the payment transaction based on the authorization request and the determined transaction history; and
transmit the prepaid risk score, in response to the API call, directly to the originating merchant.

11. An interchange network system in accordance with claim 10, wherein the processor is further programmed to:
determine a reason associated with the prepaid risk score based on the authorization request and the determined transaction history; and
transmit the prepaid risk score and the reason to the originating merchant.

12. An interchange network system in accordance with claim 10, wherein the processor is further programmed to:
store one or more approval rules for the originating merchant; and
calculate the prepaid risk score based on the authorization request, the determined transaction history, and the one or more approval rules.

13. An interchange network system in accordance with claim 12, wherein the processor is further programmed to:
determine whether to approve the payment transaction based on a comparison of the prepaid risk score and the one or more approval rules; and
if the determination is to not approve the payment transaction, transmit the determination and the prepaid risk score to the originating merchant.

14. An interchange network system in accordance with claim 13, wherein the processor is further programmed to transmit the authorization request to an issuer computer device if the determination is to approve the payment transaction.

15. An interchange network system in accordance with claim 10, wherein the second amount is at least one of an average amount for the subsequent transaction based on the transaction type and a potential post-transaction fee based on the transaction type.

16. An interchange network system in accordance with claim 10, wherein the processor is further programmed to:

determine an estimated remaining balance on the prepaid payment card based on the determined transaction history;

compare the estimated remaining balance to the first amount and the second amount; and determine whether there are sufficient funds associated with the prepaid payment card based on the comparison.

17. An interchange network system in accordance with claim 10, wherein the processor is further programmed to determine an estimated remaining balance on the prepaid payment card based on the determined transaction history, wherein the determined transaction history includes at least one denied payment transaction for insufficient funds.

18. At least one non-transitory computer-readable storage media having first and second sets of computer-executable instructions embodied thereon, wherein when executed by one or more processors implementing an interchange network, the first set of computer-executable instructions causes said one or more processors to route communications between a plurality of merchants and a plurality of issuing banks, the communications formatted according to a set of proprietary communications standards promulgated by the interchange network for the exchange of financial transaction data and the settlement of funds between financial institutions that are members of the interchange network; and provide, to an authorization computing device, transaction data for transactions by a plurality of prepaid payment cards, the transaction data extracted from the communications processed by the interchange network; and wherein when executed by the authorization computing device having at least one processor coupled to at least one memory device, the second set of computer-executable instructions cause the at least one processor to:

store a plurality of transaction histories associated with the plurality of prepaid payment cards, each of the transaction histories including the transaction data associated with the transactions made by a corresponding one of the plurality of prepaid payment cards;

receive, directly from an originating merchant via an Application Programming Interface (API) call over the Internet, an authorization request for a payment transaction between a cardholder and the originating merchant initiated using a prepaid payment card, wherein the authorization request includes a personal account number (PAN) of the prepaid payment card and a first amount for the payment transaction;

determine that a transaction type for the payment transaction indicates a high probability of a potential subsequent transaction from the originating merchant using the prepaid payment card, wherein the determining is based on the originating merchant and the first amount;

determine a second amount for the potential subsequent payment transaction based on the transaction type;

determine whether there are sufficient funds associated with the prepaid payment card for both the first amount and the second amount;

determine, by querying the plurality of transaction histories based on the personal account number (PAN), a transaction history associated with the prepaid payment card based on the plurality of transaction histories;

calculate a prepaid risk score for the payment transaction based on the authorization request and the determined transaction history; and transmit the prepaid risk score, in response to the API call, directly to the originating merchant.

* * * * *